(12) United States Patent
Banyay et al.

(10) Patent No.: US 10,035,419 B2
(45) Date of Patent: Jul. 31, 2018

(54) HEAD-UP DISPLAY FOR A VEHICLE

(71) Applicant: FORD GLOBAL TECHNOLOGIES, LLC, Dearborn, MI (US)

(72) Inventors: Matus Banyay, Frechen (DE); Marcus Haefner, Cologne (DE)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 15/393,446

(22) Filed: Dec. 29, 2016

(65) Prior Publication Data
US 2017/0182888 A1 Jun. 29, 2017

(30) Foreign Application Priority Data

Dec. 29, 2015 (DE) .................. 10 2015 226 799

(51) Int. Cl.
| G09G 5/00 | (2006.01) |
|---|---|
| B60K 35/00 | (2006.01) |
| B60R 1/00 | (2006.01) |
| G02B 5/22 | (2006.01) |
| G02B 5/30 | (2006.01) |
| G02B 27/01 | (2006.01) |
| H04N 9/31 | (2006.01) |

(52) U.S. Cl.
CPC .............. *B60K 35/00* (2013.01); *B60R 1/00* (2013.01); *G02B 5/22* (2013.01); *G02B 5/3025* (2013.01); *G02B 27/0101* (2013.01); *H04N 9/3141* (2013.01); *B60K 2350/2052* (2013.01); *B60R 2300/205* (2013.01); *B60R 2300/308* (2013.01); *B60Y 2400/92* (2013.01); *G02B 2027/0138* (2013.01)

(58) Field of Classification Search
CPC .. B60K 35/00; B60K 2350/2052; G02B 5/30; G02B 27/01; G02B 27/0101; G02B 27/288; G02B 2027/014; H04N 9/31; B32B 17/06; B32B 17/10541; B32B 2605/00; B60Q 3/40; B60Q 3/60
See application file for complete search history.

(56) References Cited

U.S. PATENT DOCUMENTS

| 4,961,625 A | * | 10/1990 | Wood | ..................... G02B 27/01 |
|---|---|---|---|---|
| | | | | 359/630 |
| 5,053,755 A | | 10/1991 | Smith et al. | |

(Continued)

FOREIGN PATENT DOCUMENTS

| DE | 3822222 A1 | 1/1990 |
|---|---|---|
| JP | H10138794 A | 5/1998 |
| JP | 2008070782 A | 3/2008 |

*Primary Examiner* — Joe H Cheng
(74) *Attorney, Agent, or Firm* — Frank A. MacKenzie; Brooks Kushman P.C.

(57) ABSTRACT

The disclosure relates to a head-up display for a vehicle. The head-up display includes a combiner screen that is arranged between a viewer and a window pane of the vehicle. The combiner screen reflects an image, which is generated by an image generating and imaging device at a front-side reflection surface, which faces the viewer, to the viewer. The viewer can perceive the generated image as an imaginary image located behind the combiner screen. A polarization filter is attached on a rearward side, which is remote from the viewer, of the reflection surface of the combiner screen.

16 Claims, 3 Drawing Sheets

(56) References Cited

U.S. PATENT DOCUMENTS

| | | | | |
|---|---|---|---|---|
| 5,214,413 A * | 5/1993 | Okabayashi | G02B 26/127 | 345/7 |
| 5,486,840 A | 1/1996 | Borrego et al. | | |
| 5,552,935 A | 9/1996 | Knoll et al. | | |
| 5,867,287 A | 2/1999 | Williams et al. | | |
| 6,262,848 B1 * | 7/2001 | Anderson | G02B 27/0101 | 359/630 |
| 6,731,435 B1 * | 5/2004 | Kormos | G02B 26/0816 | 345/7 |
| 7,123,418 B2 * | 10/2006 | Weber | G02B 5/305 | 359/630 |
| 9,715,110 B1 * | 7/2017 | Brown | G02B 27/0101 | |
| 2004/0008412 A1 * | 1/2004 | Jiang | G02B 27/0101 | 359/487.02 |
| 2005/0012682 A1 * | 1/2005 | Jenson | G02B 27/0101 | 345/7 |
| 2008/0218434 A1 * | 9/2008 | Kelly | G02B 27/01 | 345/8 |
| 2009/0195875 A1 * | 8/2009 | Pasca | G02B 27/0018 | 359/489.07 |
| 2012/0098819 A1 * | 4/2012 | Furuya | G02B 5/32 | 345/212 |
| 2013/0038511 A1 * | 2/2013 | Box | B60K 37/02 | 345/8 |
| 2014/0368923 A1 * | 12/2014 | Segawa | G02B 27/0149 | 359/633 |
| 2015/0123879 A1 * | 5/2015 | Aboshi | G09F 9/00 | 345/7 |
| 2015/0130687 A1 * | 5/2015 | Kitamura | G02B 27/01 | 345/7 |
| 2015/0251377 A1 | 9/2015 | Cleary et al. | | |
| 2016/0091716 A1 * | 3/2016 | Larson | G02B 27/0101 | 359/631 |
| 2017/0045737 A1 * | 2/2017 | Cammenga | G02B 27/0101 | |
| 2017/0052369 A1 * | 2/2017 | Shimatani | B60K 35/00 | |

* cited by examiner

HEAD-UP DISPLAY FOR A VEHICLE

CROSS-REFERENCE TO RELATED APPLICATIONS

This application claims foreign priority benefits under 35 U.S.C. § 119(a)-(d) to DE 10 2015 226 799.7 filed Dec. 29, 2015, which is hereby incorporated by reference in its entirety.

TECHNICAL FIELD

The present disclosure relates to a head-up display for a vehicle.

BACKGROUND

Head-up displays are display devices, which can be used to project information into view through a vehicle window in vehicles such as for example passenger vehicles, utility vehicles and also rail vehicles. Head-up displays in particular generate virtual images of the information to be presented, which appear to be located in front of the vehicle window, such as for example a windscreen. This offers the advantage in particular for vehicle operators that they hardly have to gaze away from a visible traffic situation in front of the vehicle when viewing displayed information, as is necessary in the case of displays on a traditional instrument panel. In addition, the displayed information is perceivable without refocusing the eyes, because the virtual image thereof appears to be located in front of the vehicle window.

Generally speaking, two principally different types of head-up displays for motor vehicles are known. One is the head-up display which projects an image that is generated by an image generating and imaging device onto the internal side of a windscreen, which serves as a reflection surface and reflects the projected image to a viewer. The viewer can perceive the image that is generated by the image generating and imaging device as an imaginary image located behind the windscreen, as viewed by him. Such a head-up display is described, for example, in U.S. Pat. No. 5,486,840.

The other type of head-up display uses not the windscreen as a reflection surface, but a separate combiner screen arranged between a viewer and a windscreen of the motor vehicle, wherein the combiner screen serves as the reflection surface and reflects the image that is generated by the image generating and imaging device to the viewer, who perceives the image thus generated as being located behind the combiner screen, as viewed by him, generally also behind the windscreen, which is arranged behind the combiner screen, as an imaginary image. Such combiner head-up displays are known for example from JP 4940850 B2, JP H10138794 A and U.S. Pat. No. 5,867,287.

A head-up display that combines a combiner element with a windscreen by way of the fact that the windscreen has a reflective beam splitter coating on its internal side is disclosed in U.S. Pat. No. 5,053,755.

One general disadvantage of the combiner head-up displays with respect to the head-up displays first mentioned is that, owing to the light-transmissive property of the combiner screen, the person viewing the head-up display can also perceive through said combiner screen undesired reflections on the windscreen of the vehicle, which can occur for example if ambient light that is incident from outside the vehicle, such as sunlight, is reflected toward the internal side of the windscreen by elements such as for example ventilation slots or edges of an instrument panel. Such reflections on the windscreen can negatively affect the viewer's perceived visual impression through the combiner screen significantly.

Against this background, the present disclosure is based on the object of providing a head-up display for a vehicle, which permits a viewer better visibility and perception of the information displayed by the head-up display.

SUMMARY

This object is achieved by way of a head-up display. Further, particularly advantageous embodiments of the disclosure are disclosed by the dependent claims.

It should be noted that the features, which are listed individually in the claims, can be combined in any desired technically meaningful manner and give further embodiments of the disclosure. The description additionally characterizes and specifies the disclosure in particular in connection with the figures.

According to the disclosure, a head-up display for a vehicle has a combiner screen that is arranged between a viewer and a window pane, for example a windscreen, of the vehicle, which combiner screen can be, for example, a glass or plastics screen. The combiner screen reflects an image, which is generated by an image generating and imaging device, at a front-side reflection surface of the combiner screen that faces the viewer in the direction of the viewer. The viewer can perceive the image thus generated as an imaginary image that is located behind the combiner screen, as viewed by him. For example, the viewer can perceive the imaginary image as being outside the vehicle at a distance of a few meters, preferably approximately 1 to 10 m, behind the combiner screen. According to the disclosure, a polarization filter is attached to a rear side, which is remote from the viewer, of the reflection surface of the combiner screen. In other words, the polarization filter is arranged behind the reflection surface as viewed by the viewer.

The disclosure is based on the idea that non-polarized light, for example sunlight, initially passes from outside the vehicle through the window pane into the vehicle's interior. A portion of the non-polarized incoming light travels directly to the rear side of the combiner screen which is reflective on its front-side, which faces the viewer (reflection surface), but is also light-transmissive. Since the incoming light, as it travels along a direct path from outside the vehicle onto the rear side of the combiner screen, is non-polarized, at least a portion of this light can pass through the polarization filter, which is attached on that rearward side, which is remote from the viewer, of the reflection surface of the combiner screen and thus also through the combiner screen, and ultimately reach the viewer's eye. In other words, the viewer can perceive the situation located behind the combiner screen, as viewed by him, outside the vehicle as desired. In addition, the situation located behind the combiner screen outside the vehicle can also be perceived by the driver with commercial polarized sunglasses, as desired.

However, a different portion of the non-polarized light that falls into the interior of the vehicle is reflected, still non-polarized, at interior parts of the vehicle, for example parts of an instrument panel, which is usually arranged between the combiner screen and the window pane, in the direction of the window pane, where it is in turn reflected toward the viewer both by its internal side and by its external side. In this way, reflection patterns of different parts of the instrument panel, such as for example ventilation slots, edges and the like, are produced, which are considered disturbing and are perceivable by the viewer when the viewer looks through the window pane. Since the combiner screen is light-transmissive, these reflection patterns can in principle overlay the image that is generated by the head-up display in a disturbing manner. The disturbing reflection patterns can here be perceived as being located behind the window pane (i.e. outside the vehicle), as viewed by the viewer, but at a significantly smaller distance from the viewer than for example the virtual image that is generated by the head-up display.

It has now been found that a major portion of the non-polarized light that is reflected at the internal and external sides of the window pane and that influences the combiner image in a disturbing manner is polarized after reflection, wherein the p-component of the light (component of the light that oscillates parallel to the plane of incidence) after reflection at the window pane is significantly weaker or completely eliminated. In other words, the light reflected at the window pane substantially only has a component that oscillates in the s-direction (the direction perpendicular to the plane of incidence). The polarization filter, which is attached to the combiner screen and on which the polarized light that is reflected by the window pane is incident, now prevents that all of this window reflection light passes through the combiner screen. The light that is reflected at the window pane therefore can no longer be perceived by the viewer when looking through the combiner screen, as a result of which the disturbing reflection patterns which overlay the virtual image that is generated by the head-up display are significantly weaker or even entirely eliminated.

On the other hand, the polarization filter that is attached to the combiner screen does not influence the perceptibility of the image generated by the head-up display, since the light of the image that is generated by the image generating and imaging device along the path from the image generating device to the viewer does not need to pass through the polarization filter, since the latter is attached behind the reflection surface of the combiner screen as viewed by the viewer.

Overall, the head-up display according to the disclosure thus significantly improves visibility and perceptibility of the information displayed by the head-up display.

According to one advantageous embodiment of the disclosure, the polarization filter is a filter which polarizes in the p-direction (the direction parallel to the plane of incidence). Consequently, the s-component (the component perpendicular to the plane of incidence) of the light that is incident on the polarization filter is filtered out or absorbed by the polarization filter. Since the light that is reflected at the window pane of the vehicle and reaches the combiner screen substantially only includes an s-component, the p-polarization filter absorbs the light that is reflected by the window pane in a desired manner.

To achieve best possible perceptibility of the image generated by the head-up display for the viewer, the polarization filter according to one further advantageous embodiment covers the entire rear side of the reflection surface of the combiner screen.

Yet another advantageous embodiment of the disclosure makes provision for the polarization filter to be attached on a rear side of the combiner screen. This embodiment is characterized by simple and cost-effective manufacturing.

Alternatively, the polarization filter according to a further advantageous embodiment of the disclosure can be attached inside the combiner screen. In this way, the polarization filter is well protected against external influences, such as mechanical wear. In addition, the polarization filter, which is configured for example as a polarization film, in this embodiment can prevent chipping of the combiner screen, similar to the case of laminated safety glass.

Yet another advantageous embodiment of the disclosure makes provision for the combiner screen to comprise two partial screens, which are arranged one behind the other and between which the polarization filter is arranged. In other words, the combiner screen consists of the two physically separate, partial screens which are connected to each other via the polarization filter. In this way, the polarization filter is likewise well protected against external influences, for example mechanical wear, since it is located between the two partial screens. In addition, the polarization filter, which is configured as a polarization film, can likewise prevent chipping of the combiner screen, as described above. The manufacturing costs of the combiner screen are, except for the second (additional) partial screen, also substantially comparatively cheap, as in the previously described embodiment variants in which the polarization filter is attached on the rear side of the combiner screen.

According to yet another embodiment of the disclosure, the polarization filter is configured in the shape of a wedge, for example as a wedge film. The result here, in particular in combination with the previously described embodiment, in which the combiner screen comprises two partial screens between which the polarization filter is arranged, is a wedge-shaped configuration of the entire combiner screen. This can be used advantageously to prevent double images in the image that is generated by the head-up display.

Further features and advantages of the disclosure result from the following description of exemplary embodiments of the disclosure that should not be understood to be limiting, and the disclosure will be explained in more detail below with reference to the drawing. In this drawing:

DETAILED DESCRIPTION

As required, detailed embodiments of the present disclosure are disclosed herein; however, it is to be understood that the disclosed embodiments are merely exemplary of the disclosure that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

Parts which are equivalent in terms of their function have the same reference signs throughout the various figures, and they are therefore generally also only described once.

Figure 1:
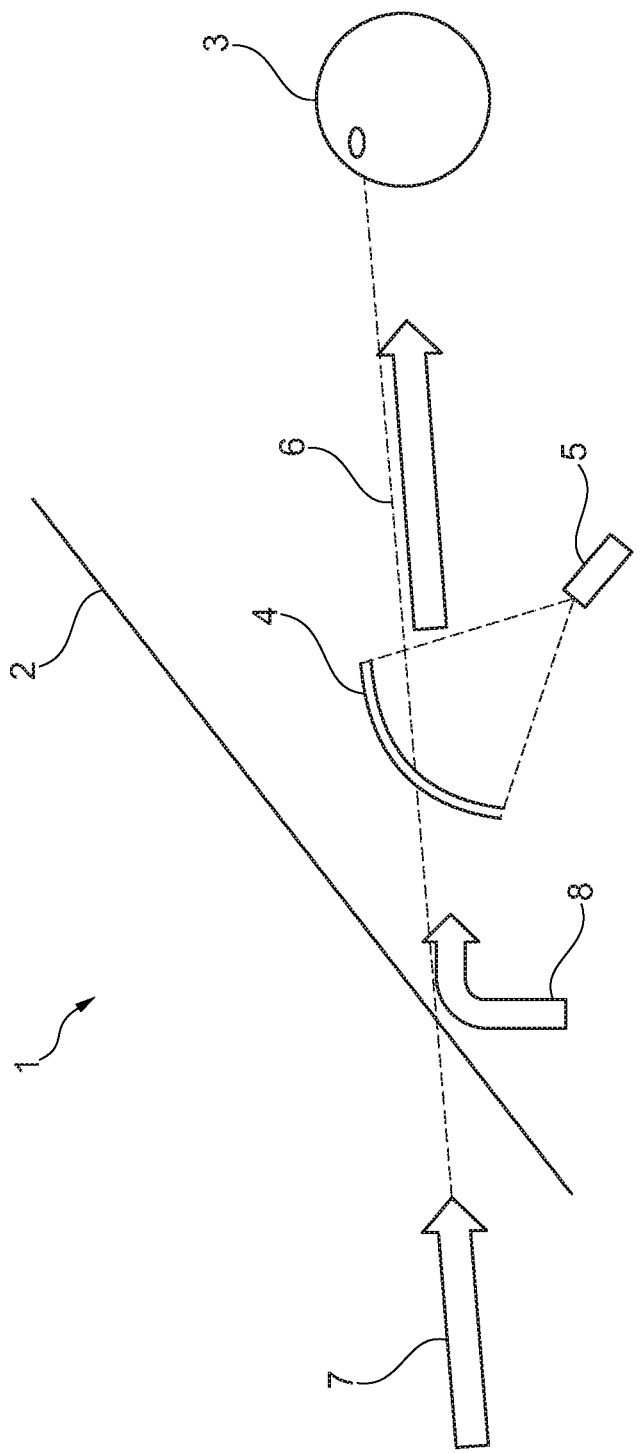
FIG. 1 schematically illustrates a side view of an exemplary embodiment of a head-up display according to the disclosure that is arranged in a vehicle, FIG. 2 schematically illustrates a plan view of the head-up display from FIG. 1, and FIG. 3 schematically illustrates a plan view of a second exemplary embodiment of the head-up display according to the disclosure.

FIG. 1 illustrates a side view of an exemplary embodiment of a head-up display 1 according to the disclosure which is arranged in a vehicle, in particular a motor vehicle. The vehicle in FIG. 1 is represented merely by way of the illustration of a window pane 2, in this case a windscreen. Furthermore, FIG. 1 shows a combiner screen 4 of the head-up display 1 that is arranged between the window pane 2 and a viewer 3. The combiner screen 4 serves for reflecting an image that is generated by an image generating and imaging device 5 of the head-up display 1 toward the viewer 3, as is indicated in FIG. 1 by way of an arrow 6, which represents the beam path of the light that is emitted by the image generating and imaging device 5 and reflected at the combiner screen 4. The viewer 3 can perceive the image that is generated in this way by the image generating and imaging device 5 as an imaginary image located behind the combiner screen 4, in particular also behind the window pane 2, at a distance of preferably between approximately 1 and 10 meters.

Furthermore, non-polarized ambient light that falls into the interior of the vehicle from outside, such as sunlight, is represented in FIG. 1 by way of an arrow 7. Reflections at the window pane 2, caused by the ambient light 7 which falls into the vehicle from outside and can in turn be reflected at parts that are located in the vehicle's interior, are marked in FIG. 1 by way of an arrow 8.

Figure 2:
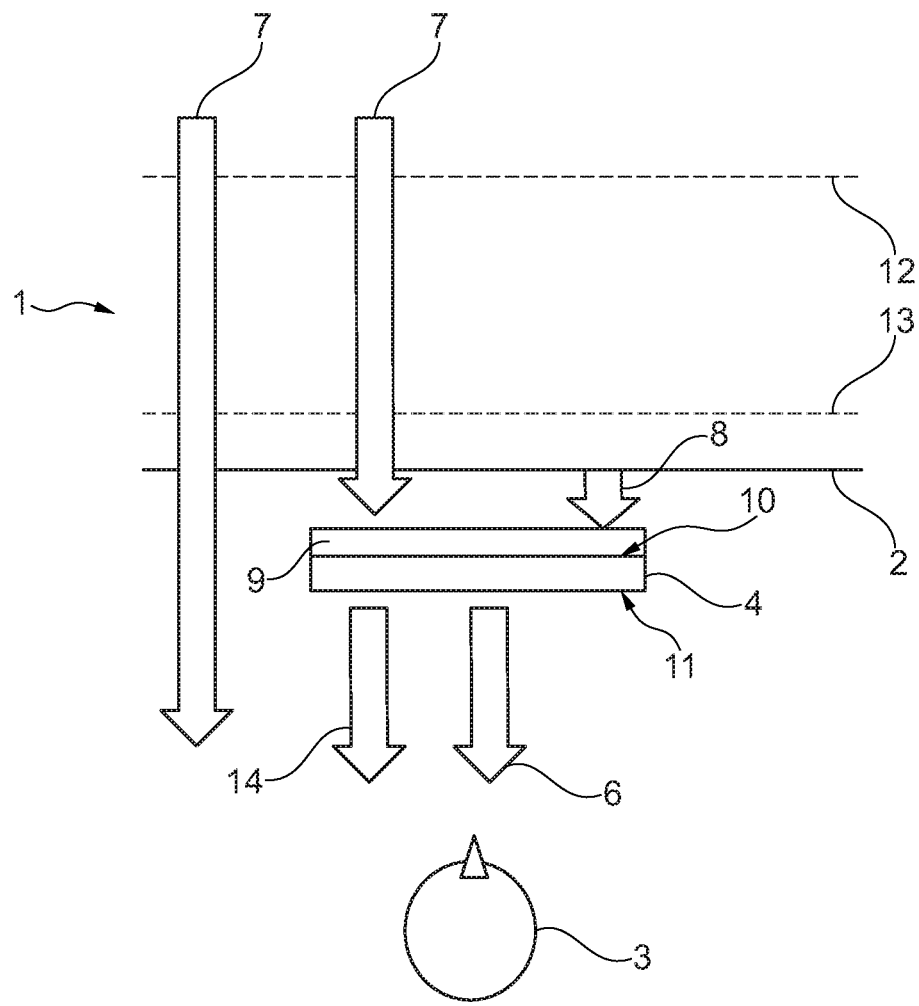

FIG. 2 illustrates a plan view of the head-up display 1 from FIG. 1. FIG. 2 shows that in the illustrated exemplary embodiment, a polarization filter 9, for example a polarization film, is attached to the rear side 10 of the combiner screen 4. FIG. 2 furthermore shows that the light 6 of the image that is generated by the image generating and imaging device 5 (shown in FIG. 1) is reflected at a front-side reflection surface 11 of the combiner screen 4, which faces the viewer 3, toward the viewer 3. Accordingly, the polarization filter 9 is attached on the rearward side of the reflection surface 11 of the combiner screen 4, which is remote from the viewer 3. In particular in the exemplary embodiment of the head-up display 1 illustrated in FIG. 2, the polarization filter 9 covers the entire rear side 10 of the combiner screen 4 and thus also the entire rear side of the reflection surface 11 of the combiner screen 4.

The viewer 3 perceives the image 6, which is generated by the image generating and imaging device 5 (see FIG. 1) of the head-up display 1 and is reflected at the reflection surface 11, as an imaginary image in the virtual image plane 12 indicated in FIG. 2. Said image plane 12 is located approximately a few meters, preferably between approximately 1 in 10 meters, in front of the viewer 3, and thus, as viewed by the viewer 3, behind the window pane or windscreen 2 and outside the vehicle. The window pane reflections 8 are perceived by the viewer 3 in a second virtual image plane 13.

FIG. 2 illustrates that the non-polarized ambient light 7, which is initially incident on the polarization filter 9, subsequently travels through the light-transmissive combiner screen 4 as polarized ambient light 14 inside the vehicle and finally reaches the viewer 3 to be perceived by him. The viewer 3 can thus perceive the situation located behind the combiner screen 4 and also behind the window pane or windscreen 2, as viewed by him, as desired.

However, as already explained above, the window pane reflections 8 are polarized after reflection at the window pane or windscreen 2, in particular s-polarized, with the result that the window pane reflections 8 are absorbed by the polarization filter 9, which is preferably a p-polarization filter. As a result, the window pane reflections 8 as desired do not pass through the light-transmissive combiner screen 4 to the viewer 3.

In this way, the visibility and perceptibility of the information presented by the head-up display 1 overall improve significantly for the viewer 3.

Figure 3:
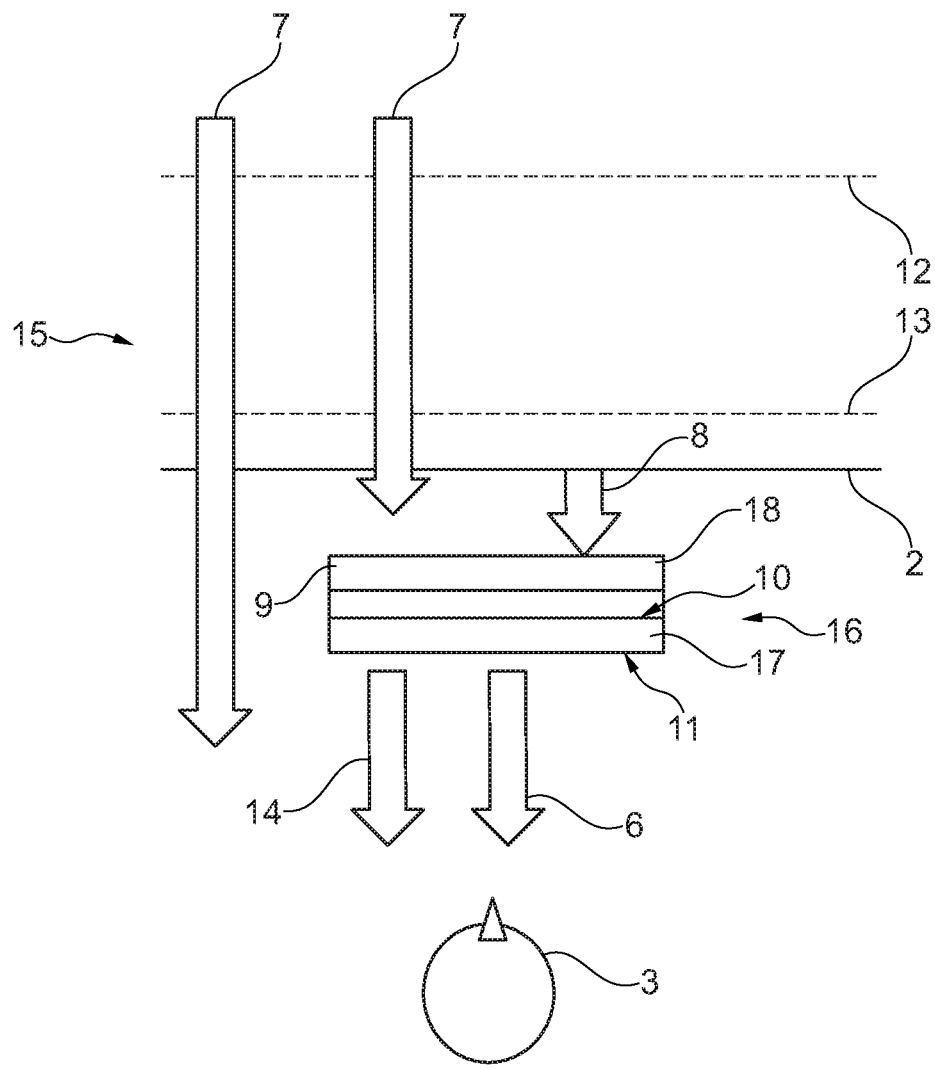

FIG. 3 illustrates a plan view of a second exemplary embodiment of a head-up display 15 according to the disclosure. FIG. 3 shows that in this exemplary embodiment, the polarization filter 9, in particular a polarization film, is arranged in a combiner screen 16. In other words, the polarization filter 9 is arranged between a partial screen 17 of the combiner screen 16 located at the front, as viewed by the viewer 3, and a partial screen 18 of the combiner screen 16 located behind it, as viewed by the viewer 3. The combiner screen 16 of the exemplary embodiment illustrated in FIG. 3 thus comprises two partial screens 17 and 18 which are arranged one behind the other and between which the polarization filter 9 is attached. The head-up display 15 shown in FIG. 3 does not significantly differ in other respects from the head-up display 1 illustrated in FIG. 2.

The polarization filter 9 could, in yet another embodiment (not illustrated), also be attached entirely within a combiner screen, in other words be completely incorporated in and enclosed by the combiner screen.

The head-up display according to the disclosure has been explained in more detail with reference to the exemplary embodiments illustrated in the figures. However, the head-up display is not limited to the embodiments described here, but comprises further embodiments which have equal effect.

In a preferred embodiment, the head-up display according to the disclosure is used in a motor vehicle.

While exemplary embodiments are described above, it is not intended that these embodiments describe all possible forms of the disclosure. Rather, the words used in the specification are words of description rather than limitation, and it is understood that various changes may be made without departing from the spirit and scope of the disclosure. Additionally, the features of various implementing embodiments may be combined to form further embodiments of the disclosure.

What is claimed is:

1. A head-up display for a vehicle, comprising:
   a combiner screen having two partial screens arranged one behind the other arranged between a viewer and a window pane to reflect an image;
   an image generating and imaging device to generate the image at a front-side reflection surface to the viewer, wherein the viewer can perceive the image as an imaginary image located behind the combiner screen; and
   a polarization filter attached on a rearward side of the reflection surface, within the combiner screen between the two partial screens and remote from the viewer.

2. The head-up display as claimed in claim 1, wherein the polarization filter is a filter that polarizes in a p-direction.

3. The head-up display as claimed in claim 1, wherein the polarization filter covers an entirety of the rearward side of the reflection surface of the combiner screen.

4. The head-up display as claimed in claim 1, wherein the polarization filter is further attached on a rear side of the first partial screen.

5. The head-up display as claimed in claim 1, wherein the polarization filter is configured in a shape of a wedge.

6. A vehicle comprising:
   a combiner screen having first and second partial screens, wherein the first partial screen is behind the second partial screen, disposed adjacent a window within a cabin;
   an imaging device to produce a reflected image on the combiner screen at a front-side reflection surface such that the reflected image is perceived as an imaginary image behind the combiner screen; and a wedge film disposed between the first and second partial screens attached on a rearward side of the reflection surface.

7. The vehicle as claimed in claim 6, wherein the rearward side of the reflection surface is remote from a viewer.

8. The vehicle as claimed in claim 6, wherein the front-side reflection surface faces a viewer within the cabin.

9. The vehicle as claimed in claim 6, wherein the combiner screen is disposed between the window and a viewer in the cabin.

10. The vehicle as claimed in claim 8, wherein the combiner screen has a wedge-shape configuration such that the wedge film disposed between the first and second partial screens.

11. A display system for a vehicle comprising:
a combiner screen configured to reflect an image between a window pane and a viewer disposed within a cabin and including first and second partial screens;
an imaging device configured to generate the image on a reflection surface toward the viewer such that the image faces the viewer and is perceived as an imaginary image behind the combiner screen; and
a p-direction polarization filter disposed between the first and second partial screens such that the polarization filter is behind the first partial screen and in front of the second partial screen.

12. The display system of claim 11, wherein the polarization filter is a wedge film and oriented such that the first and second partial screens of the combiner screen form a wedge shape.

13. The display system of claim 11, wherein the polarization filter covers an entire rear side of the reflection surface.

14. The display system of claim 11, wherein the imaginary image is disposed with a virtual image plane in front of the viewer.

15. The display system of claim 11, wherein the window pane includes reflections absorbed by the polarization filter.

16. The display system of claim 15, wherein the reflections of the window pane are perceived by the viewer in a second virtual image plane.

* * * * *